United States Patent [19]

Lubar

[11] 3,982,246

[45] Sept. 21, 1976

[54] GENERAL METHOD OF GEOMETRICAL PASSIVE RANGING

[75] Inventor: Bertram H. Lubar, Elkins Park, Pa.

[73] Assignee: The United States of America as represented by the Secretary of the Navy, Washington, D.C.

[22] Filed: Feb. 20, 1961

[21] Appl. No.: 90,605

[52] U.S. Cl. .................. 343/112 C; 235/61.5 DF; 235/61.5 E; 235/61.5 S; 235/150.27
[51] Int. Cl.² .................................... G01S 11/00
[58] Field of Search ............. 343/112, 112.1–112 C; 235/61, 61.5 DF, 61.5 E, 61.5 S, 150.27

[56] References Cited
UNITED STATES PATENTS

2,921,306   1/1960   Jaffee .................................. 343/112

*Primary Examiner*—Maynard R. Wilbur
*Assistant Examiner*—Richard E. Berger
*Attorney, Agent, or Firm*—Q. B. Warner; Henry Hansen

EXEMPLARY CLAIM

1. A passive ranging system for use by a fighter in determining the distance along the line of sight between the fighter and a target travelling at constant speed; comprising in combination: a search and track system operable to generate signals proportional to the azimuth and elevation angles of the line of sight with respect to the fighter coordinate system, a stabilized platform normally slaved to said search and track system operable to generate signals proportional to the angular rate of rotation of the line of sight and signals proportional to the acceleration of the fighter in inertial space, resolver computer means coupled to said stabilized platform operable to resolve said angular rate and acceleration signals into terms of a reference coordinate system, algebraic computer means connected to said stabilized platform and said resolver computer operable to transform said signals into a voltage form representative of range between the fighter and the target.

7 Claims, 6 Drawing Figures

GENERAL METHOD OF GEOMETRICAL PASSIVE RANGING

The invention described herein may be manufactured and used by or for the Government of the United States of America for governmental purposes without the payment of any royalties thereon or therefor.

This invention relates to a system for determining the distance between two points in space and more particularly to a passive ranging system for determining the range between a fighter and a target.

Range determining techniques are essential with the advent of more advanced armament control systems employing missiles, since it is of paramount importance to determine whether the distance from the interceptor to the target at the time of missile launching is within the aerodynamic range of a missile. Range information is also necessary because it enables the pilot to determine the moment at which he must leave the collision path to avoid colliding with the debris of the target.

It is well known that the most accurate methods for determining range between a target and interceptor makes use of techniques employing radar. In employing this method, the interceptor fighter emits or radiates microwave energy which is reflected back by the target and the time between initial radiation and receipt of the reflected wave provides an accurate measure of the range to the target. A disadvantage of this method lies in the fact that the interceptor utilizing active techniques to determine range may give his presence away. An enemy target may be employing countermeasure techniques which enable it to defeat the microwave radiation from the interceptor.

In determining range using passive ranging techniques the interceptor relies solely on the radiation emitted by the target to calculate range and thereby the possibility that the presence of the interceptor will be detected by the target is greatly reduced since no active radiation emanates from the interceptor itself.

Because of the importance of passive range measuring, many such techniques are presently under investigation. The majority of these techniques fall into one of three categories: trigonometric, optical, and maneuver (geometric) range finding.

The trigonometric range finding technique employs a pair of radiation detectors carried on the fighter which define one side of a triangle. The distance between target and interceptor defines another side of the triangle and is the range. This technique enables the computer to effect an instantaneous solution of a plane triangle with one side and two angles given or known.

Optical range finding techniques make use of simple optical laws to develop the relationship between the intensity of target radiation and the range to the target.

Maneuver techniques are based on the parameters which may be obtained from the relationship of the absolute motion of the interceptor and the relative motion of the target. These techniques derive range from the solutions of the vector equations which relate range, interceptor velocity, target velocity, bearing angle, their time derivatives and time integrals. In order to gather all the parameters necessary for the solution of the ranging equation, the interceptor may carry on certain prescribed maneuvers. For example, in one maneuver type technique the interceptor is required to fly in and then deviate from a plane defined by the line of sight and the target velocity vector. A second method requires the fighter to first position itself on a collision course and then deviate from the course while remaining in the kinematic plane, which is the plane defined by the line of sight and target velocity vectors. Both of these methods require specific maneuvers of the interceptor because they employ two dimensional geometrical techniques.

The present invention contemplates a ranging technique which involves three dimensional mathematics wherein the range vector represents the distance from the interceptor to the target directed along the line of sight. While a fighter or interceptor is normally maneuvering into position for an attack against a nonmaneuvering target, it is possible from observation and measurement of the angular motion of the line of sight between the fighter and the target, and its time derivatives, and the fighter's own motion relative to either inertial or air mass space to determine all the parameters necessary for the solution of the range equation which will be derived hereinbelow. Thus, this invention eliminates the necessity of a fighter or interceptor going through a certain prescribed or preset pattern of maneuvers in order to obtain the parameters necessary for the solution of a range equation.

Therefore it is an object of the present invention to provide a system capable of being incorporated into the fire control system of a modern interceptor or fighter which will compute distance between a target and the fighter, utilizing radiation emitted from the target.

It is another object of the present invention to provide a passive ranging system which eliminates course and maneuver restrictions on the fighter and which by measuring angular and angular rate changes both in and perpendicular to the initial kinematic plane receives sufficient information to determine distance between fighter and target.

Yet another object of the present invention is to provide a general method of geometrical passive ranging from which range information is obtained instantaneously and continually.

With these and other objects in view, as will hereinafter more fully appear, and which will be more particularly pointed out in the appended claims, reference is now made to the following description taken in connection with the accompanying drawings in which:

Figure 1:
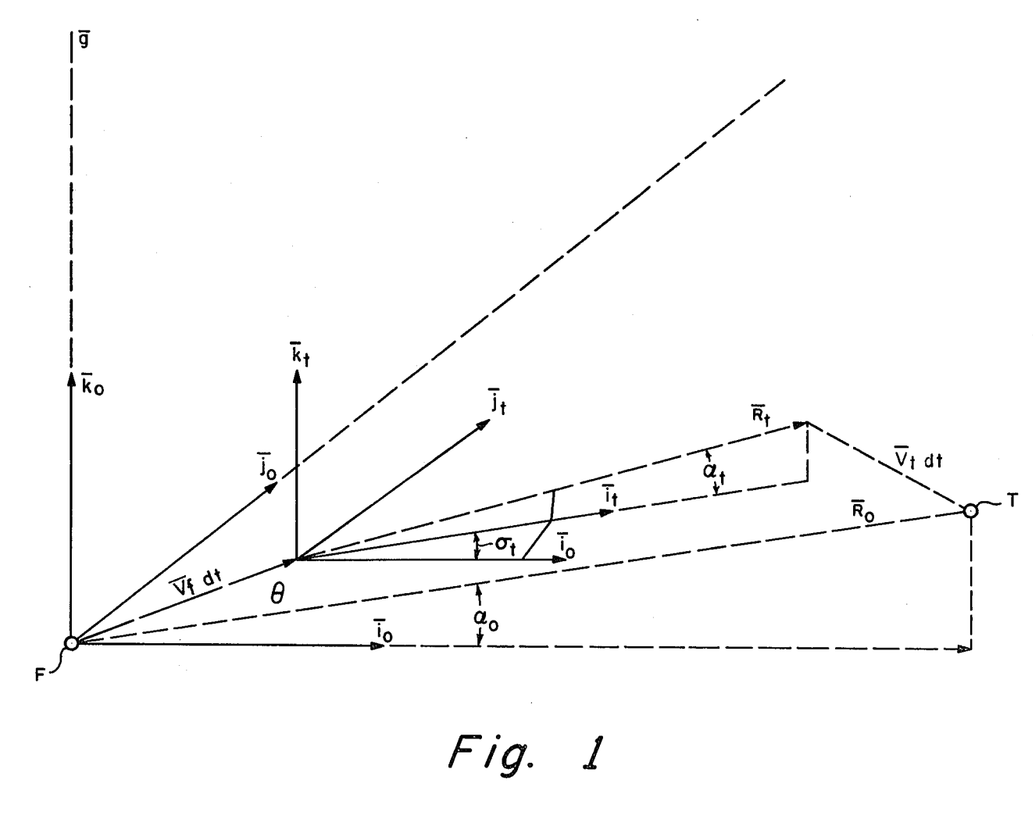
FIG. 1 represents in three dimensions the geometrical relationship between a target and a fighter.

For convenience in understanding and presenting the concept behind this invention, the physical relationships between a fighter and the target in three dimensional space, as best illustrated by FIG. 1, will now be discussed. These physical relationships are discussed with the view of ultimately obtaining the necessary parameters for derivation of the range equation. Once the physical relationship is set up and the range equation derived, the instrumentation for obtaining the necessary parameters and for the solution of the range equation will be discussed.

FIG. 1 shows a fighter and a target in three dimensional space which is represented by the vector coordinate system $\bar{i}_o \bar{j}_o \bar{k}_o$. The $\bar{k}_o$ axis is parallel to the direction of gravitational force. At a time $t = 0$, the fighter and target are in the positions shown. The distance between them is the vector $\bar{R}_o$ at time $t = 0$. The angle between the plane defined by $\bar{i}_o$ and $\bar{j}_o$ and the range vector $\bar{R}_o$ is $\alpha_o$. After a time $t$, the fighter has moved a distance represented by the vector $\bar{V}_F dt$ and the target has moved a distance represented by the vector $\bar{V}_t dt$. The distance between the fighter and the target at time $t$ is represented by the vector $\bar{R}_t$. The angle between the respective horizontal projections in the $\bar{i}, \bar{j}$ plane of the range vector at time $t = 0$ and at time $t$ is represented by angle $\sigma_t$. The angle between the new line of sight $\bar{R}_t$ and the plane defined by the $\bar{i}_t$ and $\bar{j}_t$ vectors is represented by $\alpha_t$.

Definition of Coordinate System

Consider an orthogonal, three dimensional, right-handed, unit vector coordinate system $\bar{i}_t \bar{j}_t \bar{k}_t$, to be defined by any two noncoincident vectors, $\bar{a}_t$ and $\bar{b}_t$ intersecting at a common origin F. In general $\bar{a}_t$ and $\bar{b}_t$ are functions of time, and the origin F is being translated with a velocity $V_{Ft}$ relative to some inertial reference origin O. Further the vectors $\bar{a}_t$ and $\bar{b}_t$ may be rotating in space, so that the resultant coordinate system $\bar{i}_t \bar{j}_t \bar{k}_t$ is rotating with a rate $\omega_t$ relative to inertial space.

The coordinate system used in deriving the range equation of the present invention is defined below:

$$\bar{i}_t = \bar{j}_t \times \bar{k}_t \qquad (1)$$

$$\bar{j}_t = \frac{\bar{k}_t \times \bar{b}_t}{|\bar{b}_t| \sin \theta_t} \qquad (2)$$

$$\bar{k}_t = \frac{\bar{a}_t}{|\bar{a}_t|} \qquad (3)$$

where $\theta_t$ is the angle between $\bar{a}_t$ and $\bar{b}_t$

X represents a vector cross product.

General Geometric Relationships

Consider a point T moving with a velocity $\dot{\bar{R}}_t$ relative to the origin F of the $\bar{i}_t \bar{j}_t \bar{k}_t$ coordinate system at a vector distance $\bar{R}_t$ from the origin F. Any velocity $\bar{V}_{Tt}$ that point T has relative to a fixed reference 0 must be the vector sum of $\dot{\bar{R}}_t$ and the velocity $\bar{V}_{Ft}$ of F relative to the 0 reference so that $$\bar{V}_{T_t} = \dot{\bar{R}}_t + \bar{V}_{F_t} \text{ or } \dot{\bar{R}}_t = \bar{V}_{T_t} - \bar{V}_{F_t} \qquad (4)$$

$\bar{R}_t - \bar{R}_o$ is the integral of $\dot{\bar{R}}_t$ from time $t_0$ to time $t$:

$$\bar{R}_t - \bar{R}_o = \int_o^t \dot{\bar{R}}_t \, dt = \int_o^t (\bar{V}_{T_t} - \bar{V}_{F_t}) \, dt \qquad (5)$$

Since the coordinate $\bar{i}_t \bar{j}_t \bar{k}_t$ will in general be rotating with a rate $\bar{\omega}_t$, the effect of this rotation upon the parameters involved must necessarily be considered.

$$\bar{\omega}_t = \bar{i}_t (\omega_{\bar{i}})_t + \bar{j}_t (\omega_{\bar{j}})_t + \bar{k} (\omega_{\bar{k}})_t \qquad (6)$$

As the above equation states $\bar{\omega}_t$ is made up of the three components of rotation about the individual coordinate axes $\bar{i}_t \bar{j}_t \bar{k}_t$.

It is known that the time rate of change of each unit vector equals the cross product of total rotation rate $\bar{\omega}_t$ with each respective vector:

$$\dot{\bar{i}}_t = \bar{\omega}_t \times \bar{i}_t = (\omega_{\bar{k}})_t \bar{j}_t - (\omega_{\bar{j}})_t \bar{k}_t \qquad (7)$$

$$\dot{\bar{j}}_t = \bar{\omega}_t \times \bar{j}_t = (\omega_{\bar{i}})_t \bar{k}_t - (\omega_{\bar{k}})_t \bar{i}_t \qquad (8)$$

$$\dot{\bar{k}}_t = \bar{\omega}_t \times \bar{k}_t = (\omega_{\bar{j}})_t \bar{i}_t - (\omega_{\bar{i}})_t \bar{j}_t \qquad (9)$$

For a gravity-dependent system, $\bar{a}_t = \bar{g}_t$, $\bar{b}_t = \bar{R}_t$, and $\theta_t = 90° - \alpha_t$, where $\bar{g}_t$ is the gravity vector $\bar{\alpha}_t$ is the angle of elevation of the line of sight at time $t$.

$\bar{R}_t$ is the range vector and is the desired quantity.

Therefore, the coordinate system to be used in the derivation of $\bar{R}_t$ is defined by:

$$\bar{k}_t = \bar{g}_t / |\bar{g}_t| \qquad (10)$$

$$\bar{j}_t = (\bar{k}_t \times \bar{R}_t)/(R_t/\cos \alpha_t) \qquad (11)$$

$$\bar{i}_t = \bar{j}_t \times \bar{k}_t \qquad (12)$$

from equation (11)

$$\bar{j}_t |R_t|\cos \alpha_t = \bar{k}_t \times \bar{R}_t$$

Since $$\bar{i}_t = \bar{j}_t \times \bar{k}_t \qquad (13)$$

$$\bar{i}_t R_t \cos \alpha_t = \bar{j}_t \times \bar{k}_t R_t \cos \alpha_t = (\bar{k}_t \times \bar{R}_t) \times \bar{k}_t$$

But $$(\bar{k}_t \times \bar{R}_t) \times \bar{k}_t = \bar{R}_t + \bar{k}_t R_t \sin \alpha_t$$

Therefore $$\bar{R}_t = \bar{i}_t |R_t| \cos \alpha_t - \bar{k}_t R_t \sin \alpha_t \qquad (14)$$

and substituting from equation (4), noting $R_t = R_t$:

$$\dot{\bar{R}}_t = (\bar{V}_{T_t} - \bar{V}_{F_t}) = \dot{\bar{i}}_t R_t \cos \alpha_t + \bar{i}_t \dot{R}_t \cos \alpha_t - \bar{i}_t R_t \dot{\alpha}_t \sin \alpha_t - \dot{\bar{k}}_t R_t \sin \alpha_t - \bar{k}_t \dot{R}_t \sin \alpha_t - \bar{k}_t R_t \dot{\alpha}_t \cos \alpha_t \qquad (15)$$

from equation (15); taking components along $\bar{i}_t, \bar{j}_t$ and $\bar{k}_t$:

$$(\bar{V}_{T_t} - \bar{V}_{F_t}) \cdot \bar{i}_t = \dot{R}_t \cos \alpha_t - R_t \dot{\alpha}_t \sin \alpha_t - R_t (\omega_{\bar{j}})_t \sin \alpha_t \qquad (16)$$

$$(\bar{V}_{T_t} - \bar{V}_{F_t}) \cdot \bar{j}_t = R_t (\omega_{\bar{k}})_t \cos \alpha_t + R_t (\omega_{\bar{i}})_t \sin \alpha_t \qquad (17)$$

$$(\bar{V}_{T_t} - \bar{V}_{F_t}) \cdot \bar{k}_t = -R_t (\omega_{\bar{j}})_t \cos \alpha_t - \dot{R}_t \sin \alpha_t - R_t \dot{\alpha}_t \cos \alpha_t \qquad (18)$$

and from equation (5)

$$\bar{R}_t - \bar{R}_o = \int_0^t (\bar{V}_{T_t} - \bar{V}_{F_t}) \, dt \qquad (5)$$

$$\bar{R}_t \cdot \bar{i}_o - \bar{R}_o \cdot \bar{i}_o = \int_o^t (\bar{V}_{T_t} - \bar{V}_{F_t}) \cdot \bar{i}_o \, dt \qquad (19)$$

$$\bar{R}_t \cdot \bar{j}_o - \bar{R}_o \cdot \bar{j}_o = \int_o^t (\bar{V}_{T_t} - \bar{V}_{F_t}) \cdot \bar{j}_o \, dt \qquad (20)$$

$$\overline{R}_t \cdot \overline{k}_o - \overline{R}_o \cdot \overline{k}_o = \int_0^t (\overline{V}_{T_t} - \overline{V}_{F_t}) \cdot \overline{k}_o dt \quad (21)$$

Since the velocity at time $t$ may be considered in terms of velocity at time $t_o$ and the integral of the acceleration from time $t_o$ to $t$.

$$\overline{V}_{T_t} = \overline{V}_{T_o} + \int_0^t \dot{\overline{V}}_{T_t} dt \quad (22)$$

$$\overline{V}_{F_t} = \overline{V}_{F_o} + \int_0^t \dot{\overline{V}}_{F_t} dt \quad (23)$$

Substituting from equations 16, 17, and 18 with $t = t_o$ into equations 19, 20, and 21, we have, noting that $$\int_0^t A_o dt = A_o t:$$

$$\overline{R}_t \cdot \overline{i}_o = R_o \cdot \overline{i}_o + \int_0^t \int_0^t (\dot{\overline{V}}_{T_t} - \dot{\overline{V}}_{F_t}) \cdot \overline{i}_o dtdt + \dot{R}_o t \cos \alpha_o \quad (24)$$

$$- R_o t \dot{\alpha}_o \sin \alpha_o - R_o (\omega_j)_o \sin \alpha_o$$

$$\overline{R}_t \cdot \overline{j}_o = \overline{R}_o \cdot \overline{j}_o + \int_0^t \int_0^t (\dot{\overline{V}}_{T_t} - \dot{\overline{V}}_{F_t}) \cdot \overline{j}_o dtdt \quad (25)$$

$$+ R_o t (\omega_{\overline{k}})_o \cos \alpha_o + R_o t (\omega_{\overline{i}})_o \sin \alpha_o$$

$$\overline{R}_t \cdot \overline{k}_o = \overline{R}_o \cdot \overline{k}_o + \int_0^t \int_0^t (\dot{\overline{V}}_{T_t} - \dot{\overline{V}}_{F_t}) \cdot \overline{k}_o dtdt \quad (26)$$

$$+ R_o t (\omega_{\overline{j}})_o \cos \alpha_o - \dot{R}_o t \sin \alpha_o - R_o t \dot{\alpha}_o \cos \alpha_o$$

For the physical conditions we are investigating, i.e. nonmaneuvering target, and a sufficiently short time interval such that $\overline{g}$ remains constant, $\dot{\overline{V}}_{T_t} = 0$; $(\omega_{\overline{i}})_t = (\omega_{\overline{j}})_t = 0$. Also, we note $\overline{R}_o \cdot \overline{i}_o = R_o \cos \alpha_o$, $\overline{R}_o \cdot \overline{j}_o = 0$, $\overline{R}_o \cdot \overline{k}_o = -R_o \sin \alpha_o$; and for consistency call $(\omega_{\overline{k}})_o = \dot{\sigma}_o$:

$$\overline{R}_t \cdot \overline{i}_o = R_o \cos \alpha_o - \int_0^t \int_0^t \dot{\overline{V}}_{F_t} \cdot \overline{i}_o dtdt \quad (27)$$

$$+ \dot{R}_o t \cos \alpha_o - R_o t \dot{\alpha}_o \sin \alpha_o$$

$$\overline{R}_t \cdot \overline{j}_o = - \int_0^t \int_0^t \dot{\overline{V}}_{F_t} \cdot \overline{j}_o dtdt + R_o t \dot{\sigma}_o \cos \alpha_o \quad (28)$$

$$\overline{R}_t \cdot \overline{k}_o = R_o \sin \alpha_o - \int_0^t \int_0^t \dot{\overline{V}}_{F_t} \cdot \overline{k}_o dtdt \quad (29)$$

$$- \dot{R}_o t \sin \alpha_o - R_o t \dot{\alpha}_o \cos \alpha_o$$

Multiplying equation 27 by $\sin \alpha_o$ and adding to it equation 29 multiplied by $\cos \alpha_o$, we have (eliminating $\dot{R}_o$)

$$\overline{R}_t \cdot \overline{i}_o \sin \alpha_o + \overline{R}_t \cdot \overline{k}_o \cos \alpha_o = -\sin \alpha_o \int_0^t \int_0^t \dot{\overline{V}}_{F_t} \cdot \overline{i}_o dtdt \quad (30)$$

$$- \cos \alpha_o \int_0^t \int_0^t \dot{\overline{V}}_{F_t} \cdot \overline{k}_o dtdt - R_o t \dot{\alpha}_o$$

and substituting $R_o t$ from equation 28 into equation 30 we have:

$$\overline{R}_t \cdot \overline{i}_o \sin \alpha_o + \overline{R}_t \cdot \overline{k}_o \cos \alpha_o = -\sin \alpha_o \int_0^t \int_0^t \dot{\overline{V}}_{F_t} \cdot \overline{i}_o dtdt \quad (31)$$

$$- \cos \alpha_o \int_0^t \int_0^t \dot{\overline{V}}_{F_t} \cdot \overline{k}_o dtdt$$

$$- \frac{\dot{\alpha}_o}{\dot{\sigma}_o \cos \alpha_o} (\overline{R}_t \cdot \overline{j}_o + \int_0^t \int_0^t \dot{\overline{V}}_{F_t} \cdot \overline{j}_o dtdt)$$

and $$\overline{R}_t \cdot \overline{j}_o = R_t \cos \alpha_t \sin \sigma_t \quad (32)$$

$$\overline{R}_t \cdot \overline{i}_o = R_t \cos \alpha_t \cos \sigma_t \quad (33)$$

$$\overline{R}_t \cdot \overline{k}_o = -R_t \sin \alpha_t \quad (34)$$

which is the range vector $\overline{R}_t$ resolved on the $\overline{i}_o \overline{j}_o \overline{k}_o$ axes. Rationalizing and expanding:

$$R_t \dot{\sigma}_o \cos \alpha_o \sin \alpha_o \cos \alpha_t \cos \sigma_t - R_t \dot{\sigma}_o \cos^2 \alpha_o \sin \alpha_t = \quad (35)$$

$$- \dot{\sigma}_o \sin \alpha_o \cos \alpha_o \int_0^t \int_0^t \dot{\overline{V}}_{F_t} \cdot \overline{i}_o dtdt - \dot{\sigma}_o \cos^2 \alpha_o \int_0^t \int_0^t \dot{\overline{V}}_{F_t} \cdot \overline{k}_o dtdt$$

$$- R_t \dot{\alpha}_o \cos \alpha_t \sin \sigma_t - \dot{\alpha}_o \int_0^t \int_0^t \dot{\overline{V}}_{F_t} \cdot \overline{j}_o dtdt$$

and collecting terms in $R_t$:

$$R_t = \frac{\frac{\sin \alpha_o}{\cos \alpha_o} \int_0^t \int_0^t \vec{V}_{F_f} \cdot \vec{i}_o dt dt + \frac{\dot{\alpha}_o}{\dot{\sigma}_o \cos^2 \alpha_o} \int_0^t \int_0^t \vec{V}_{F_f} \cdot \vec{j}_o dt dt + \int_0^t \int_0^t \vec{V}_{F_f} \cdot \vec{k}_o dt dt}{\sin \alpha_t - \frac{\dot{\alpha}_o}{\dot{\sigma}_o \cos^2 \alpha_o} \cos \alpha_t \sin \sigma_t - \frac{\sin \alpha_o}{\cos \alpha_o} \cos \alpha_t \cos \sigma_t} \quad (36)$$

Instrumentation

Figure 2:
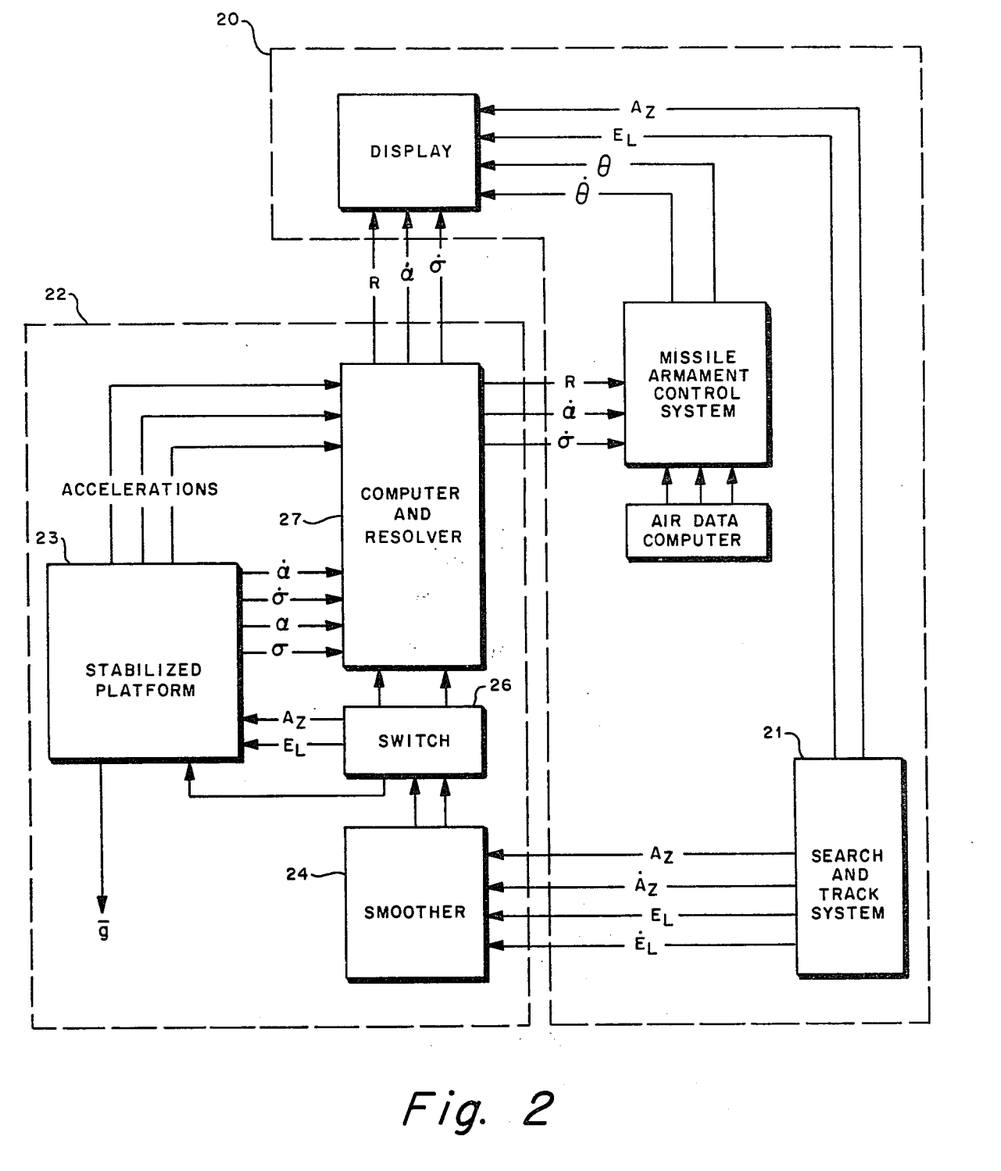
FIG. 2 shows a block diagram representation of the general instrumentation of the range equation incorporated in the fire control system of an aircraft.

FIG. 2 illustrates in block diagram form the passive ranging system of this invention incorporated in the fire control system of a modern fighter aircraft. The search and track system 21, which is sensitive to radiation emitted by a body, such as an enemy aircraft, is of the type generally carried by many fighter aircraft. It generates azimuth and elevation angle signals and angular rate signals which are fed through a smoother 24 to a switch 26. A stabilized platform 23 may be of the four gimbal type commonly used in fighter aircraft for navigation purposes. The stabilized platform 23 is normally slaved to the search and track system. In the track mode, the search and track system 21 supplies voltages representing the angles of elevation and azimuth ($E_t$ and $A_z$) of the antenna relative to the aircraft. Two of the four platform gimbals are torqued to align the $\bar{R}$ axis in space. Two of the platform gimbals maintain the inner platform as a gravity reference. The platform is then tracking the line of sight to the target and determining the $\bar{i}\bar{j}\bar{k}$ axes. Stabilized platform 23, by virtue of $\bar{j}$ and $\bar{k}$ axes gyros, generates signals proportional to $\dot{\alpha}$ and $\dot{\sigma}$ which are the first derivatives of the general angles defined in connection with FIG. 1. The stabilized platform also has linear accelerometers along each of the $\bar{i}\bar{j}\bar{k}$ axes.

The passive ranging system 22 can operate in two different modes which depend on the coordinate reference system chosen. In one case (continuous tracking) the signals proportional to accelerations from the stabilized platform must be resolved in terms of the $\bar{i}\bar{j}\bar{k}$ axes. The signals $\dot{\alpha}$ and $\dot{\sigma}$ from the gyros do not need to be resolved since each is measured directly because the gyros are coincident with the $\bar{i}\bar{j}\bar{k}$ reference system at the time of measurement.

The second mode of operation is called the Freed Platform type in which at time $t = 0$ the platform is stabilized to maintain the $\bar{i}_o \bar{j}_o \bar{k}_o$ axes in space. The accelerometers along these axes in the platform supply fighter acceleration components directly. However, resolvers are necessary to determine the required trigonometric functions of $\alpha_t$ and $\sigma_t$ in terms of the $\bar{i}_o \bar{j}_o \bar{k}_o$ coordinate reference system.

In short, in the first case the stabilized platform 23 gives the $\alpha_t$ and $\sigma_t$ information directly while the acceleration components of the aircraft must be resolved. In the second case the stabilized platform 23 gives the acceleration components directly while the angular information must be resolved.

Continuing with the description of FIG. 2, all of the signals from stabilized platform 23 are fed into resolver and computer 27, the resolver part of which resolves either the acceleration components or the angles depending upon in which mode it is desired to operate the ranging system. The computer part of resolver and computer 27 solves the range equation 36 to give a signal proportional to $\bar{R}$ which may be fed into display 28 for immediate indication of the range.

The second mode of operation of the passive ranging system is the preferred embodiment of this invention and is more fully described in connection with FIGS. 3, 4 and 5.

Figure 3:
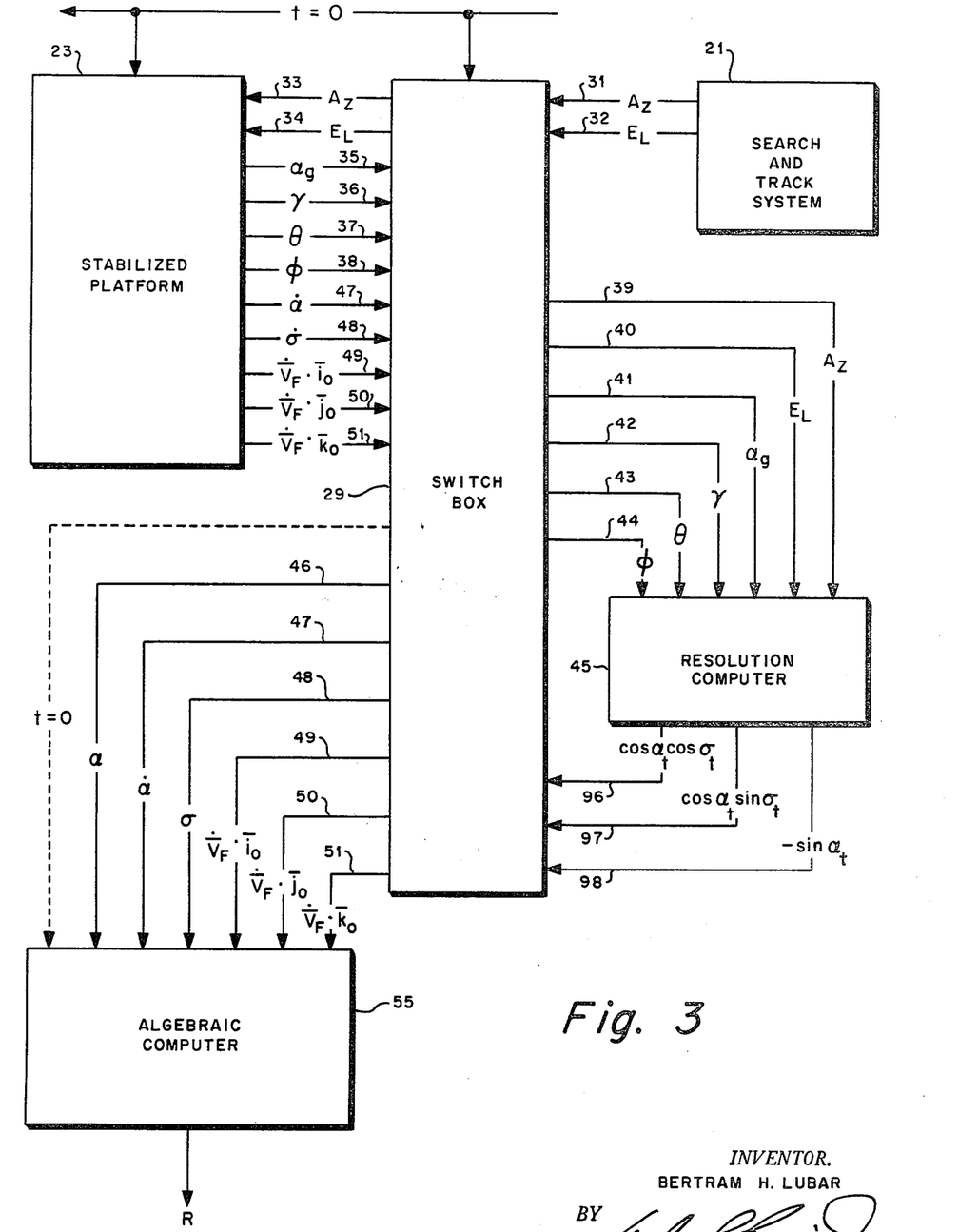
FIG. 3 illustrates in block diagram form the preferred embodiment of this invention.

FIG. 3 illustrates the manner in which the range equation is mechanized. Reference numeral 21 represents a conventional search and track antenna system of the type that seeks out and tracks a target normally emitting any type of radiations. As a result of tracking the target, the search and track system generates two angles, $A_z$ and $E_t$. $A_z$ is the azimuth angle of the line of sight from the antenna to the target. $E_t$ is the elevation angle of the line of sight from the antenna to the target.

Reference numeral 23 represents a stabilized platform of the type carried by many modern military aircraft. It is capable of developing signals proportional to the four angles which are here defined as $\theta$ = platform azimuth angle
$\phi$ = platform elevation (outer pitch) angle
$\gamma$ = platform roll angle
$\alpha_g$ = platform inner pitch angle The platform is also capable of producing signals proportional to the components of fighter acceleration along the coordinate system axes defined by the stabilized platform.

The signals representing azimuth and elevation $A_z$ and $E_t$ are fed from the search and track system via conductors 31, 32, switch box 29 and conductors 33 and 34 as shown in FIG. 3. The stabilized platform is slaved to the search and track system and during the tracking interval before time, $t = 0$ $$A_z = \theta \text{ and } E_t = \phi$$

while $\gamma$ and $\alpha_g$ are determined by the relative position of the line of sight and the gravity vector.

The stabilized platform contains rate gyro for each of the general coordinate axes $\bar{i}\bar{j}\bar{k}$ which generate signals proportional to $\alpha$, $\dot{\alpha}$ and $\dot{\sigma}$ where $\dot{\sigma}$ is in general the rate of rotation about the $\bar{k}$ axis and $\dot{\alpha}$ is the rotation rate about the $\bar{j}$ axis.

At a certain time, $t = 0$, the switch box is operated to disconnect the signals representing $A_z$ and $E_t$ from the stabilized platform which is consequently freed to become a free space stabilized platform defining an inertial reference coordinate system $\bar{i}_o \bar{j}_o \bar{k}_o$ with the one condition that the $\bar{k}_o$ axis as shown in FIG. 1 is parallel with the gravity vector $\bar{g}$.

At this time $t = 0$, $A_z = \theta$, $E_l = \phi$, and the angles $\theta$, $\phi$, $\gamma$ and $\alpha_g$ are representative only of fighter rotation about the stabilized platform. The azimuth and elevation angles are representative only of the rotation of the line of sight or range vector $\bar{R}$ about the origin of the $\bar{x}$ $\bar{y}$ $\bar{z}$ coordinate system of the aircraft.

Reference numeral 45 represents a coordinate transformation and resolution computer to be described more fully hereinafter which receives as inputs at time $t = 0$ signals proportional to angles $A_z$, $E_l$, $\theta$, $\phi$, $\gamma$, and $\alpha_g$ on conductors 39 through 44 respectively which are connected to stabilized platform 23 by conductors 34 through 38 respectively via switch box 29 which serves to pass these signals at and after time $t = 0$.

Also at time $t = 0$ algebraic computer 55, more fully described hereinbelow, receives as inputs through switch box 29 signals proportional to the acceleration components of the fighter along the respective $\bar{i}_o \bar{j}_o \bar{k}_o$ inertial coordinate axes. These signals represent or are proportional to $\dot{V}_F \cdot \bar{k}_o$, $\dot{V}_F \cdot \bar{j}_o$, and $\dot{V}_F \cdot \bar{i}_o$, respectively shown on conductors 51, 50, and 49. Algebraic computer 55 also receives signals proportional to $\dot{\alpha}$ and $\dot{\sigma}$ and $\int \dot{\alpha} dt$ or $\alpha$ which at time $t = 0$ are representative $\dot{\alpha}_o$ and $\dot{\sigma}_o$ and $\alpha_o$.

By referring to equation 36 the various terms necessary for the solution for $\bar{R}_t$ are seen. It may be seen by reference to the above part of the specification that the $\dot{V}_F \cdot \bar{i}_o$, $\dot{V}_F \cdot \bar{j}_o$, and $\dot{V}_F \cdot \bar{k}_o$ acceleration components are obtained directly from the stabilized platform since at time $t = 0$ the platform defines the inertial coordinate system $\bar{i}_o \bar{j}_o \bar{k}_o$. Angles $\theta$, $\phi$, $\alpha_g$, $\gamma$, $E_l$ and $A_z$ are gimbal and antenna angles and must be resolved into functions of $\alpha_t$ and $\sigma_t$ by expressing them in terms of the $\bar{i}_o \bar{j}_o \bar{k}_o$ inertial coordinate system.

In the range equation derivation, equations 34 to 36, expressions $(\bar{R}_t \cdot \bar{j}_o) R_t = \cos \alpha_t \sin \sigma_t$ $(\bar{R}_t \cdot \bar{i}_o) R_t = \cos \alpha_t \cos \sigma_t$ $(\bar{R}_t \cdot \bar{k}_o) R_t = -\sin \alpha_t$ appear. These expressions which appear in the denominator of range equation 36 are necessary for the solution of the equation. Angles $\alpha_t$ and $\sigma_t$ have previously been defined as $\alpha$ and $\sigma$ at time $t$.

The above expression can be stated in matrix form thus:

fore mathematically manipulated in resolution computer 45 to obtain as outputs the expressions contained in II so that they may be fed into algebraic computer 55 which at this point has all the necessary inputs to solve equation 36.

The manner in which the signals representing angles $\theta$, $\phi$, $\gamma$, $\alpha_g$, $E_l$, and $A_z$ are mechanized in resolution computer 45 to provide signals representing the expressions of II will now be discussed in reference to FIG. 4.

Figures 4, 6:
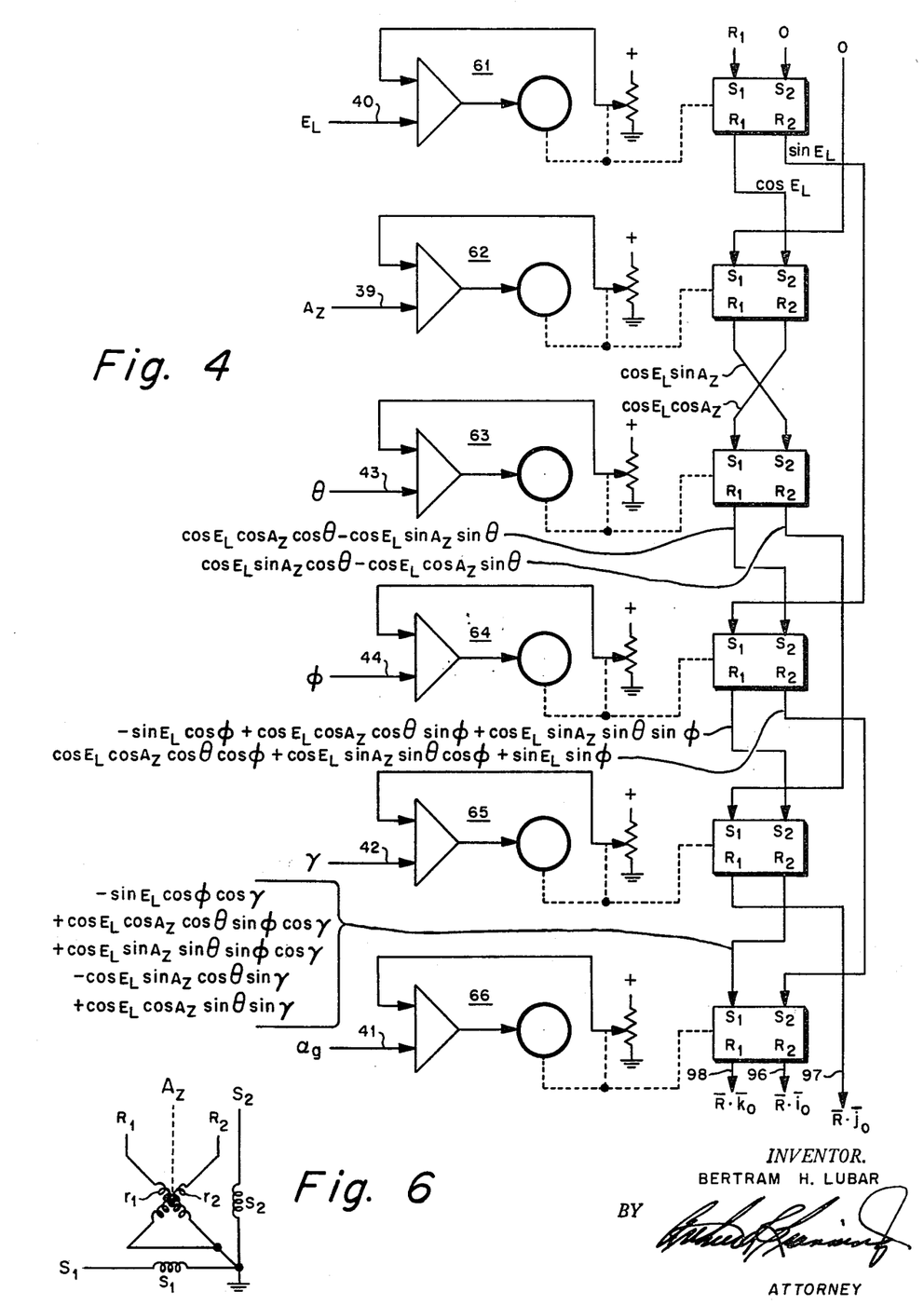
FIG. 4 is a detailed representation of the resolver computer of FIG. 3.
FIG. 6 is a schematic illustration of the resolvers used in the resolver computer of FIG. 4.

Resolver computer 45 receives signals proportional to $E_l$, $A_z$, $\theta$, $\phi$, $\gamma$, and $\alpha_g$ which are coupled into resolver units 61, 62, 63, 64, 65, 66, respectively, as shown in FIG. 4, which have the function of obtain $$\frac{\bar{R}}{|R|}$$

in terms of $\bar{i}_o \bar{j}_o \bar{k}_o$, the terms shown in tabulation II.

The resolvers used are of the a.c. type, shown in FIG. 6, in which the inputs are fed in on terminals $S_1$ and $S_2$ and the outputs are delivered on terminals $R_1$ and $R_2$. The rotor coils $r_1$ and $r_2$ are rotated an amount proportional to a shaft input which in this case is proportional to an angle. If the resolver shown in FIG. 6 has $S_1$ and $S_2$ as inputs. The outputs are of the form:

$R_1 = S_1 \cos A_z + S_2 \sin A_z$ $R_2 = -S_1 \sin A_z - S_2 \cos A_z$ where $A_z$ is the angle through which the rotors $r_1$ and $r_2$ are rotated.

Figure 5:
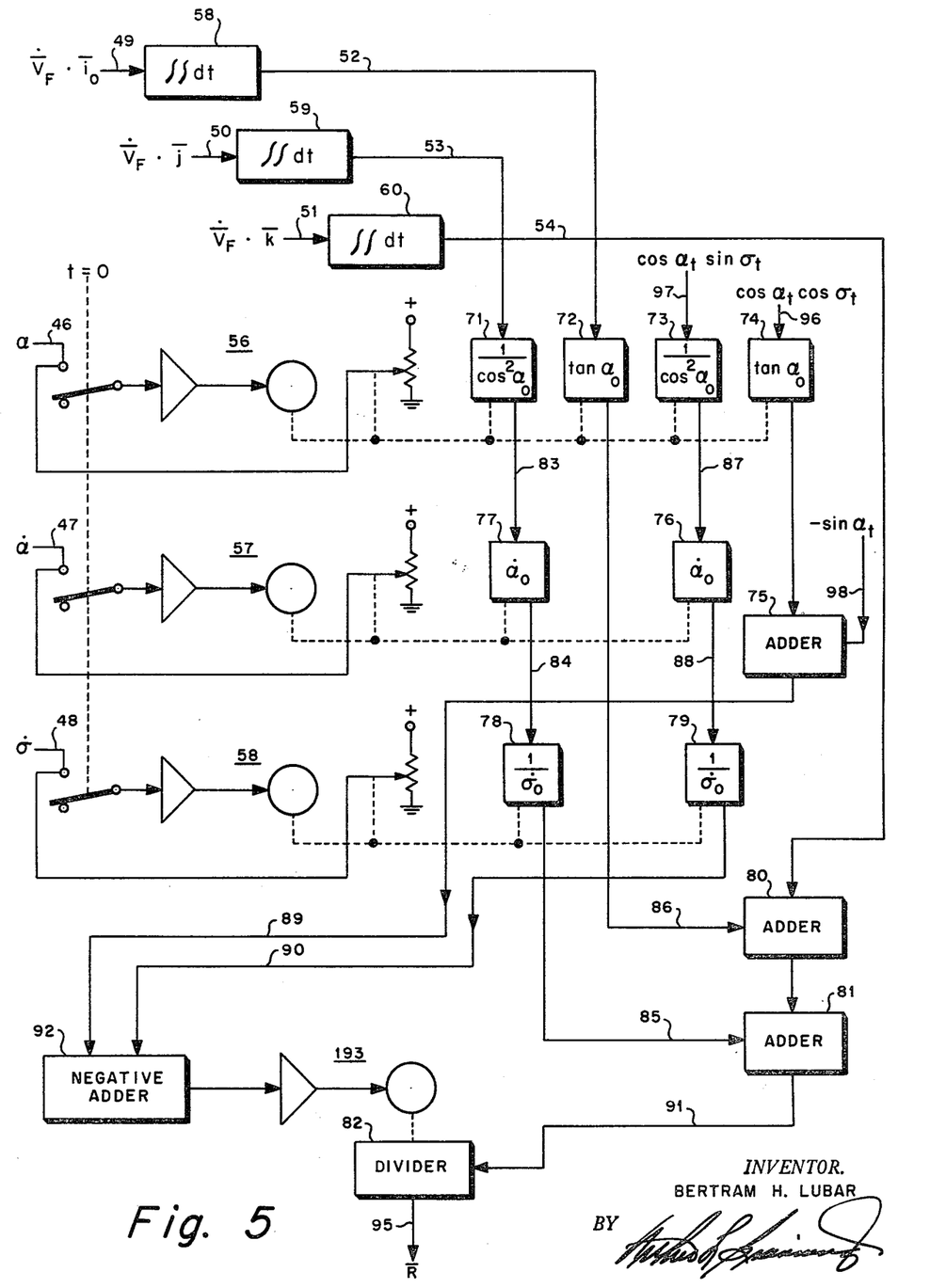
FIG. 5 is a detailed representation of the algebraic computer of FIG. 3.

Taking resolver 62 of FIG. 5 as an illustrative example of the manner in which the resolver computer operates, $S_1 = 0$ and $S_2 = \cos E_l$. Therefore, the outputs at $R_1$ and $R_2$ are:

$R_1 = \cos E_l \sin A_z$ $R_2 = \cos E_l \cos A_z$ $R_1$ and $R_2$ become the inputs to resolver 63 at $S_2$ and $S_1$ respectively.

The remaining resolvers 63 through 66 operate in a manner similar to that of resolver 62. The output signals from each successive resolver are as shown in FIG. 4. The resulting output signals at terminals 68, 69, and 67 are then representative of $\bar{R}$ in terms of the $\bar{i}_o \bar{j}_o \bar{k}_o$ axes as shown in tabulation II and are in the form necessary to serve as inputs to algebraic computer 55.

It is again noted that the matrix expression of $$M = \begin{array}{c|c} & \dfrac{\bar{R}}{|R|} \\ \hline \bar{i}_o & \cos \alpha_t \cos \sigma_t \\ \bar{j}_o & \cos \alpha_t \sin \sigma_t \\ \bar{k}_o & -\sin \alpha_t \end{array}$$

which is equivalent to $$\frac{\bar{R}}{|R|}$$

$$\bar{i}_o \quad \begin{array}{l} \cos E_1 \cos A_z \, [\cos\alpha\cos\theta\cos\phi - \sin\alpha\sin\gamma\sin\theta - \sin\alpha\cos\gamma\sin\phi\cos\theta] \\ + \cos E_1 \sin A_z \, [\cos\alpha\sin\theta\cos\phi + \sin\alpha\sin\gamma\cos\theta - \sin\alpha\cos\gamma\sin\phi\sin\theta] \\ + \sin E_1 \, [\cos\alpha\sin\phi + \sin\alpha\cos\gamma\cos\phi] \end{array}$$

$$\bar{j}_o \quad \begin{array}{l} \cos E_1 \cos A_z \, [\sin\gamma\sin\phi\cos\theta - \cos\gamma\sin\theta] \\ + \cos E_1 \sin A_z \, [\cos\gamma\cos\theta + \sin\gamma\sin\phi\sin\theta] - \sin E_1 \sin\gamma\cos\phi \end{array}$$

$$\bar{k}_o \quad \begin{array}{l} \cos E_1 \cos A_z \, [\sin\alpha\cos\theta\cos\phi + \sin\gamma\cos\alpha\sin\theta + \cos\alpha\cos\gamma\sin\phi\cos\theta] \\ + \cos E_1 \sin A_z \, [\sin\alpha\sin\theta\cos\phi - \sin\gamma\cos\alpha\cos\theta + \cos\alpha\cos\gamma\sin\phi\sin\theta] \\ + \sin E_1 \, [\sin\alpha\sin\phi - \cos\alpha\cos\gamma\cos\phi] \end{array}$$

since both are expressions for $\bar{R}_t$ in terms of the $\bar{i}_o \bar{j}_o \bar{k}_o$ coordinate system. The above matrix expression of $\bar{R}_t$ contains function of $\theta$, $\phi$, $\gamma$, $\alpha_g$, $E_l$, and $A_z$ as can be seen. The signals proportional to these angles are there- $$\frac{\bar{R}}{|R|}$$

in terms of the $\bar{i}_o, \bar{j}_o, \bar{k}_o$ as shown in tabulation II is the mathematical equivalent to that of tabulation I.

The foregoing discussion of FIGS. 3 and 4 has presented an embodiment of the invention to the point where all the parameters $\dot{\alpha}, \dot{\sigma}, \alpha, \bar{V}_F \cdot \bar{i}_o, \bar{V}_F \cdot \bar{j}_o, \bar{V}_F \cdot \bar{k}_o$, cos $\alpha_t$cos $\sigma_t$, cos $\alpha_t$sin $\sigma_t$, $-\sin \alpha_t$ are obtained and ready to be mathematically manipulated to solve range equation 36.

FIG. 5 shows algebraic computer 55 in more detail and illustrates a method by which range equation 36 may be mechanized.

The acceleration components $\bar{V}_F \cdot \bar{i}_o, \bar{V}_F \cdot \bar{j}_o$, and $\bar{V}_F \cdot \bar{k}_o$ are inserted into computer 55 where each is integrated twice by integrators 58, 59, and 60. The output from integrator 58 is connected via line 52 to tangent function generator and multiplier 72. The output from integrator 59 is connected via line 53 to reciprocal cosine square function generator and multiplier 71. The output from integrator 60 is connected via conductor 54 to adder 80. The outputs cos $\alpha_t$sin $\sigma_t$, cos $\alpha_t$cos $\sigma_t$, $-\sin \alpha_t$ from resolver computer 45 are directly connected to reciprocal cosine square function generator and multiplier 73, tangent function generator and multiplier 74, and adder 75, respectively.

Servo loop 56 has an input representing $\alpha$ driving the mechanical elements of function generators 71, 72, 73, and 74. At time $t = 0$ this input becomes a constant value represented by $\alpha_o$. Servo loops 57 and 58 are similar to servo loop 56 and function to insert values of $\dot{\alpha}$ and $\dot{\sigma}$, which at time $t = 0$ become $\dot{\alpha}_o$ and $\dot{\sigma}_o$, into function generator and multipliers 76, 77, 78, and 79, respectively.

The output from integrator 59 is multiplied by each of the functions contained in function generators 71, 77, and 78 and the final product is fed into adder 81 on conductor 85. The output from integrator 58 is multiplied by the function contained in function generator 72 and this product is fed into adder 80 on conductor 86. The output of integrator 60 is fed directly into the adder 80 by conductor 54. The output from adder 80 is added to the output from function generator 78 in adder 81 and the output from adder 81 is fed into divider 82 on conductor 91 to provide a signal proportional to numerator of equation 36.

A signal representing the product tan $\alpha_o$cos $\alpha_t$cos $\sigma_t$, formed in function generator and multiplier 74, is added to a signal representing $-\sin \alpha$ in adder 75, the output of which is fed to negative adder 92 on conductor 89. When the signal representing cos $\alpha_t$sin $\sigma_t$ passes through each of function generator and multipliers 73, 76, and 79 the final output on conductor 90 is a signal representing the quantity $$\frac{(\cos\alpha_t \sin\sigma_t)}{\dot{\sigma}_o \cos^2\alpha_o} \dot{\alpha}_o,$$

which is an input to negative adder 92.

The output from negative adder 92 is converted as a mechanical input to divider 82 by servo loop 93 where it serves as the denominator of equation 33. The output of divider 82 is then a voltage representing the range given by equation 36.

The passive ranging system of this invention has been developed to enable it to be easily incorporated into a fighter already equipped with a stabilized platform and a passive type search and track radar system.

Various other modifications of the present invention are possible in the light of the above teachings. It is therefore to be understood that within the scope of the appended claims, the invention may be practiced otherwise than as specifically described.

What is claimed is:

1. A passive ranging system for use by a fighter in determining the distance along the line of sight between the fighter and a target travelling at constant speed; comprising in combination: a search and track system operable to generate signals proportional to the azimuth and elevation angles of the line of sight with respect to the fighter coordinate system, a stabilized platform normally slaved to said search and track system operable to generate signals proportional to the angular rate of rotation of the line of sight and signals proportional to the acceleration of the fighter in inertial space, resolver computer means coupled to said stabilized platform operable to resolve said angular rate and acceleration signals into terms of a reference coordinate system, algebraic computer means connected to said stabilized platform and said resolver computer operable to transform said signals into a voltage form representative of range between the fighter and the target.

2. A system carried by a fighter for passively determining range between the fighter and a radiation emitting target travelling at a constant velocity, comprising in combination: a search and track antenna system operable to generate signals proportional to the azimuth and elevation angles of the line of sight to the target with respect to the coordinate system of the fighter, a stabilized platform for defining an inertial reference coordinate system, said stabilized platform being slaved to said search and track system and responsive to said azimuth and elevation signals to determine and generate signals proportional to angular and angular rate deviations of the line of sight from said inertial reference system, said stabilized platform including means for generating signals proportional to fighter acceleration components along the axes of said inertial reference system, resolver means connected to said stabilized platform operable to transform said angular and angular rate signals and said acceleration component signals into terms of said inertial reference coordinate system, means coupled to said resolver operable to determine and display the range between said fighter and said target.

3. A passive ranging system carried by a fighter for determining the distance along the line of sight between the fighter and a radiation emitting target travelling at a constant velocity; comprising in combination: a radiation sensitive search and track system operable to continuously generate signals proportional to azimuth and elevation angles of the target relative to the fighter, a stabilized platform normally slaved to said search and track system and defining a general coordinate reference system herein designated $\bar{i}\bar{j}\bar{k}$, said stabilized platform operable to generate signals proportional to fighter acceleration components along the $\bar{i}\bar{j}\bar{k}$ axes, said said stabilized platform operable to generate signals proportional to the angle between the line of sight and the horizontal plane defined by the $\bar{i}\bar{j}$ plane, the angular rotation rate of the line of sight about the $j$ axis, and the angular rotation rate of the line of sight about the $k$ axis, a memory device coupled to said stabilized platform for receiving said angle and angular rotation rate signals generated by said stabilized platform as inputs thereto operable to store said angle and angular rotation rate signals at time $t = 0$, means for connecting said azimuth and elevation angle signals to said stabilized platform, switch means for disconnecting said azimuth and elevation angle signals from said stabilized platform at time $t = 0$ to establish and maintain an inertial coordinate reference system herein designated $\bar{i}_o \bar{j}_o \bar{k}_o$ whereby said stabilized platform generates gimbal angle signals proportional to fighter rotation about said inertial coordinate reference system, a resolution computer connected to said stabilized platform and said search and track system operable to transform said signals proportional to said gimbal angles and said azimuth and elevation angles in terms of said inertial coordinate reference system, algebraic computer means coupled to said resolver computer and said stabilized platform arranged to receive said stored angle and angular rotation rate signals, acceleration component signals along the axes of the inertial coordinate reference system and said transformed signals proportional to gimbal, azimuth and elevation whereby said algebraic computer determines said distance between the fighter and target.

4. A passive ranging system for use by a fighter in determining the distance along the line of sight between the fighter and a radiation emitting target travelling at a constant velocity; comprising in combination: a search and track system operable to generate signals proportional to the azimuth and elevation angle of the line of sight to the target with respect to the fighter, a stabilized platform establishing a reference coordinate system herein designated $\bar{i} \bar{j} \bar{k}$ normally slaved to said search and track system operable to generate signals proportional to the angle between the line of sight and the $\bar{i}, \bar{j}$ plane, the rotation rate of the line of sight about the $\bar{j}$ axis, the rotation rate of the line of sight about the $\bar{k}$ axis, means for disconnecting said search and track system from said stabilized platform at time $t = 0$ to establish within said stabilized platform a fixed inertial reference system herein designated $\bar{i}_o \bar{j}_o \bar{k}_o$, said stabilized platform at time $t = 0$ and thereafter operable to generate signals proportional to only fighter rotation about said inertial reference coordinate system and acceleration components of the fighter along the $\bar{i}_o \bar{j}_o \bar{k}_o$, memory means coupled to said stabilized platform for storing said angle and rotation rate signals at time $t = 0$, resolver computer means coupled to said stabilized platform and said search and track system operable to resolve said signals proportional to azimuth and elevation angles and said signals proportional to fighter rotation about said inertial reference coordinate into signals proportional to the angular position of the line of sight in terms of the inertial coordinate reference system, algebraic computer means coupled to said stabilized platform and said resolver computer receiving as inputs said stored angle and rotation rate signals, said signals proportional to acceleration components of the fighter along said inertial reference coordinate system axes, and said signals proportional to the angular position of the line of sight in terms of the inertial coordinate reference system, said algebraic computer operable to determine the range between the fighter and the target.

5. A passive ranging system for use by a fighter in computing distance along the line of sight from the fighter to a target travelling at constant velocity; comprising in combination: a search and track system operable to generate signals proportional to azimuth and elevation angles of the target with respect to the fighter, a stabilized platform slaved to said search and track system operable to continuously generate signals proportional to the angles subtended by the line of sight with respect to the coordinate system herein designated by $\bar{i} \bar{j} \bar{k}$ of the stabilized platform, said stabilized platform operable to generate signals proportional to fighter acceleration components along the axes of said coordinate system, resolver means coupled to said stabilized platform operable to transform said signals proportional to fighter acceleration components in terms of the coordinate system defined by said stabilized platform at time $t = 0$, computer means connected to said stabilized platform and said resolver computer means to receive as input the signals proportional to the angles subtended by the line of sight and said transformed signals proportional to fighter acceleration components whereby said computer determines the distance along the line of sight from fighter to target.

6. A passive ranging system for use with a fighter in determining the distance along the line of sight between the fighter and a radiation emitting targer travelling a constant velocity, comprising in combination: a search and track system operable to generate signals proportional to $E_L$ and $A_z$, where $E_L$ is the elevation angle of the line of sight to the target with respect to the fighter and $A_z$ is the azimuth angle of the line of sight to the target with respect to the fighter; a stabilized platform of the type having four gimbals establishing a reference coordinate system herein designated $\bar{i} \bar{j} \bar{k}$ normally slaved to said search and track system operable to generate signals proportional to $\alpha$, $\dot{\alpha}$ and $\dot{\sigma}$, where $\alpha$ equals the angle between the line of sight and the plane defined by the $\bar{i} \bar{j}$ axis, $\dot{\alpha}$ equals the rotation rate of the line of sight about the $\bar{j}$ axis, and $\dot{\sigma}$ equals the rotation rate of the line of sight about the $\bar{k}$ axis; means for disconnecting said search and track system from said stabilized platform at time $t = 0$ to establish within said stabilized platform a fixed inertial reference system, herein designated $\bar{i}_o \bar{j}_o \bar{k}_o$; said stabilized platform at time $t = 0$ and thereafter operable to generate signals proportional to the gimbal angles $\phi$, $\theta$, $\gamma$, and $\alpha_g$ where $\theta$ equals platform azimuth angle (displacement about $\bar{k}_o$ axis), $\phi$ equals platform elevation angle (displacement about $\bar{j}_o$ axis), $\gamma$ equals platform roll angle (displacement about $\bar{i}_o$ axis), $\alpha_g$ equals platform inner pitch angle which describe fighter rotation about said inertial reference coordinate system; said stabilized platform also operable to generate signals proportional to acceleration components of the fighter along the $\bar{i}_o \bar{j}_o \bar{k}_o$ axes where $\dot{V}_F \bar{i}_o$ equals fighter acceleration along the $\bar{i}$ axis, $\dot{V}_F \bar{j}_o$ equals fighter acceleration along the $\bar{j}_o$ axis; and $\dot{V}_F \bar{k}_o$ equals fighter acceleration along the $\bar{k}_o$ axis; memory means coupled to said stabilized platform for storing $\alpha$, $\dot{\alpha}$ and $\dot{\sigma}$ signals at time $t = 0$, at which time $\alpha$ becomes $\alpha_o$, $\dot{\alpha}$ becomes $\dot{\alpha}_o$ and $\dot{\sigma}$ becomes $\dot{\sigma}_o$; resolver computer means coupled to said stabilized platform and said search and track system operable to resolve said signals proportional to $E$, $A$, $\theta$, $\phi$, $\gamma$, and $\alpha_g$ into signals indicative of the angular position of the line of sight in terms of the inertial coordinate reference system at time $t = t$, which are $\cos \alpha_t \cos \sigma_t$, $\cos \alpha_t \sin \sigma_t$, and $-\sin \alpha_t$ which are expressions for range vector taken along the $\bar{i}_o \bar{j}_o \bar{k}_o$ axes respectively at time $t = t$ where $\alpha = \alpha_t$ at time $t = t$ and where $\sigma = \sigma_t$ at time $t = t$; algebraic computer means coupled to said stabilized platform and said resolver computer receiving as inputs said stored angle and rotation rate signals $\alpha_o$, $\dot{\alpha}_o$, $\dot{\sigma}_o$, said acceleration component signals $\dot{V}_F \cdot \bar{i}_o$, $\dot{V}_F \cdot \bar{j}_o$, $\dot{V}_F \cdot \bar{k}_o$, $\cos \alpha_t \cos \sigma_t$, $\cos \alpha_t \sin \sigma_t$, and $-\sin \alpha_t$, whereby said algebraic computer transforms and combines these inputs into a voltage representative of the range equation:

$$\frac{\frac{\sin \alpha_o}{\cos \alpha_o} \int_o^t \int_o^t \dot{V}_{F_t} \cdot \bar{i}_o dt dt + \frac{\dot{\alpha}_o}{\dot{\sigma}_o \cos^2 \alpha_o} \int_o^t \int_o^t \dot{V}_{F_t} \cdot \bar{j}_o dt dt + \int_o^t \int_o^t \dot{V}_{F_t} \cdot \bar{k}_o dt dt}{\sin \alpha_t - \frac{\dot{\alpha}_o}{\dot{\sigma}_o \cos^2 \alpha_o} \cos \alpha_t \sin \sigma_t - \frac{\sin \alpha_o}{\cos \alpha_o} \cos \alpha_t \cos \sigma_t}$$

7. A method for passively determining the range along the line of sight between a fighter and a target travelling at constant velocity, comprising the steps of: determining the azimuth and elevation angles of the line of sight with repect to the fighter coordinate system, determining the angular rate of rotation of the fighter about an inertial coordinate reference system, determining fighter acceleration with respect to inertial space, resolving said azimuth, elevation, and rotation rate angles into angular quantities representative of the position of the line of sight with respect to said inertial coordinate system, and determining from said angular quantities and said acceleration the range along the line of sight from fighter to target.

* * * * *